(12) United States Patent
Balensiefer et al.

(10) Patent No.: US 7,810,682 B2
(45) Date of Patent: Oct. 12, 2010

(54) JUVENILE SEAT WITH REMOVABLE, WEARABLE INFANT CARRIER SLING

(75) Inventors: Eugene R. Balensiefer, Seymour, IN (US); Jeffrey A. Deboer, Ann Arbor, MI (US); Evan Carpenter-Crawford, Farmington Hills, MI (US)

(73) Assignee: Cosco Management, Inc., Wilmington, DE (US)

( * ) Notice: Subject to any disclaimer, the term of this patent is extended or adjusted under 35 U.S.C. 154(b) by 1202 days.

(21) Appl. No.: 11/277,482

(22) Filed: Mar. 24, 2006

(65) Prior Publication Data

US 2006/0261105 A1 Nov. 23, 2006

Related U.S. Application Data

(60) Provisional application No. 60/664,770, filed on Mar. 24, 2005.

(51) Int. Cl.
*B60N 2/28* (2006.01)
*A47D 13/02* (2006.01)

(52) U.S. Cl. ............... 224/158; 224/159; 224/257; 224/258; 297/219.12; 297/256.16

(58) Field of Classification Search ............... 224/158, 224/159, 161, 160, 275, 585, 257, 258; 297/219.12, 297/250.1, 253, 254, 255, 256.15, 256.16, 297/256, 467
See application file for complete search history.

(56) References Cited

U.S. PATENT DOCUMENTS

| 5,243,724 | A |   | 9/1993  | Barnes |
|-----------|---|---|---------|--------|
| 5,267,680 | A |   | 12/1993 | Torok |
| 5,309,586 | A |   | 5/1994  | Sies et al. |
| 5,366,271 | A | * | 11/1994 | Johnston et al. ......... 297/250.1 |
| 5,540,365 | A |   | 7/1996  | LaMair |
| 5,567,008 | A | * | 10/1996 | Cone, II .............. 297/256.16 |
| 5,573,156 | A |   | 11/1996 | McConnell |
| 5,611,095 | A |   | 3/1997  | Schneider |
| 5,950,261 | A |   | 9/1999  | Hay et al. |
| 6,000,753 | A |   | 12/1999 | Cone, II |
| 6,017,088 | A | * | 1/2000  | Stephens et al. ....... 297/256.16 |
| 6,065,655 | A |   | 5/2000  | Parewick |
| 6,341,818 | B1| * | 1/2002  | Verbovszky et al. ... 297/219.12 |
| 6,367,875 | B1|   | 4/2002  | Bapst |
| 6,592,183 | B2| * | 7/2003  | Kain ....................... 297/253 |
| 2004/0074937 | A1 |   | 4/2004 | Thomas |

FOREIGN PATENT DOCUMENTS

EP 0901053 3/1999
GB 2143727 2/1985

OTHER PUBLICATIONS

European Search Report dated May 26, 2008, for European Application EP06252738.

\* cited by examiner

*Primary Examiner*—Nathan J Newhouse
*Assistant Examiner*—Steven M Landolfi, Jr.
(74) *Attorney, Agent, or Firm*—Barnes & Thornburg LLP

(57) ABSTRACT

An infant basin is adapted to be mounted in a basin-receiving cavity of a seat shell. A shoulder strap is provided for the infant basin.

16 Claims, 8 Drawing Sheets

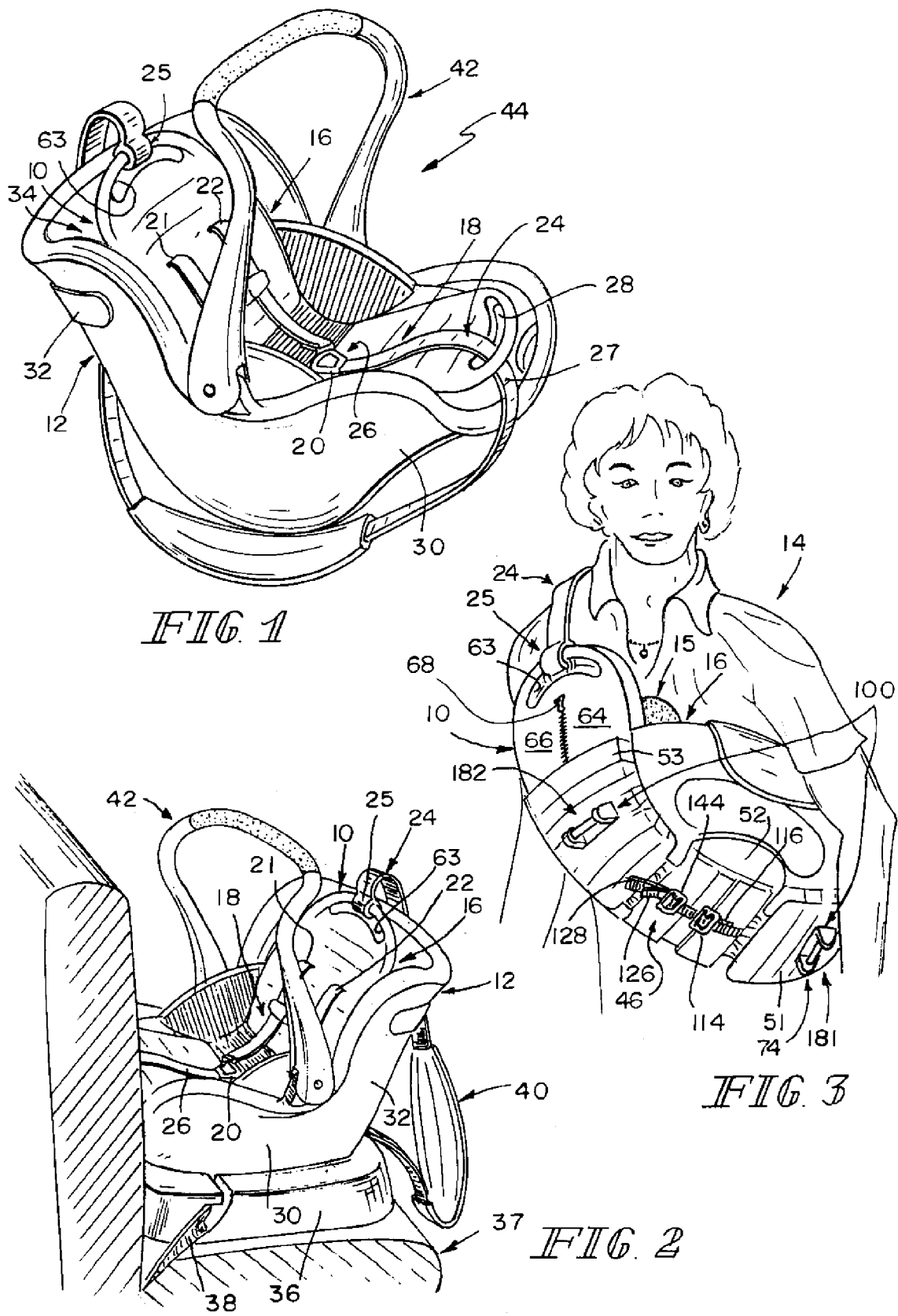

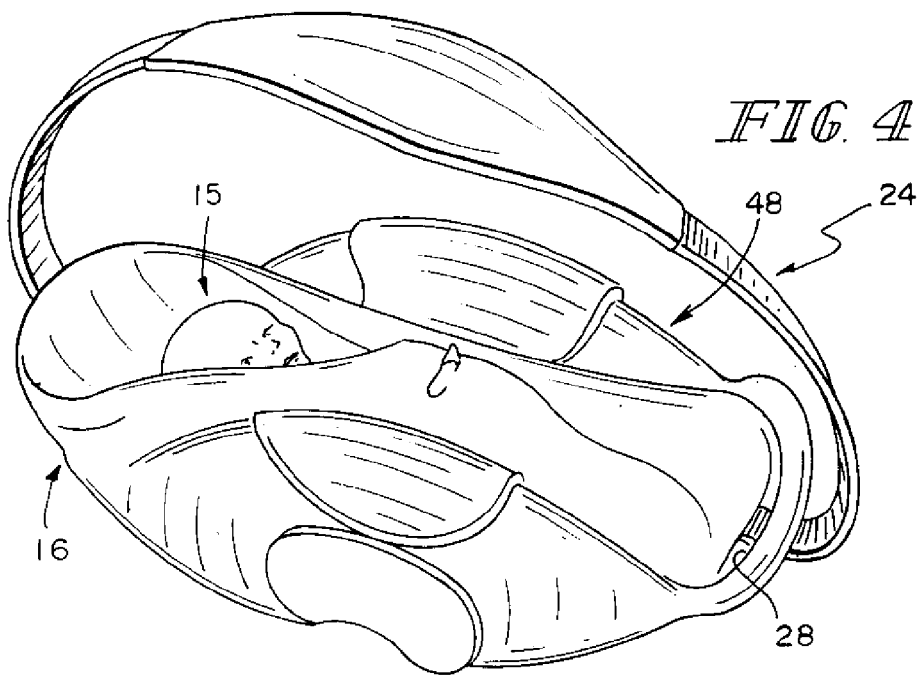
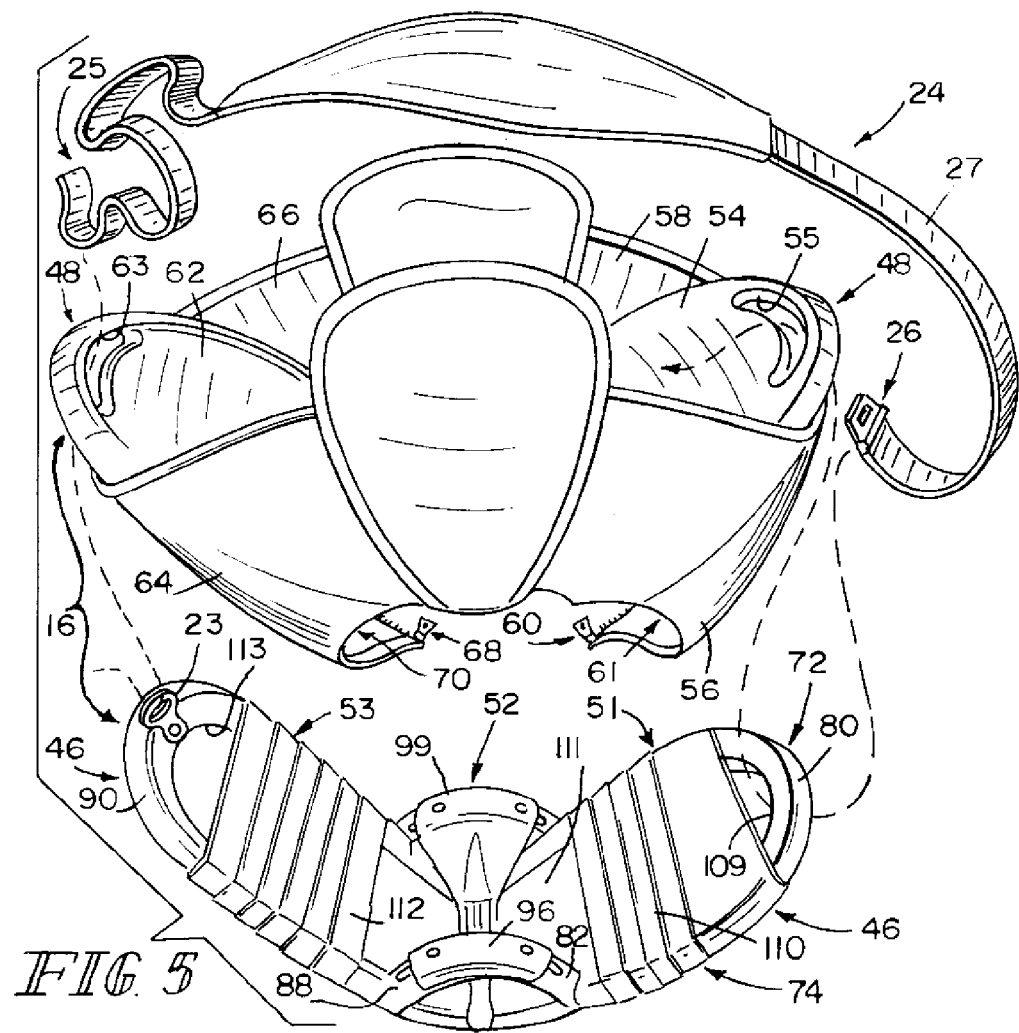

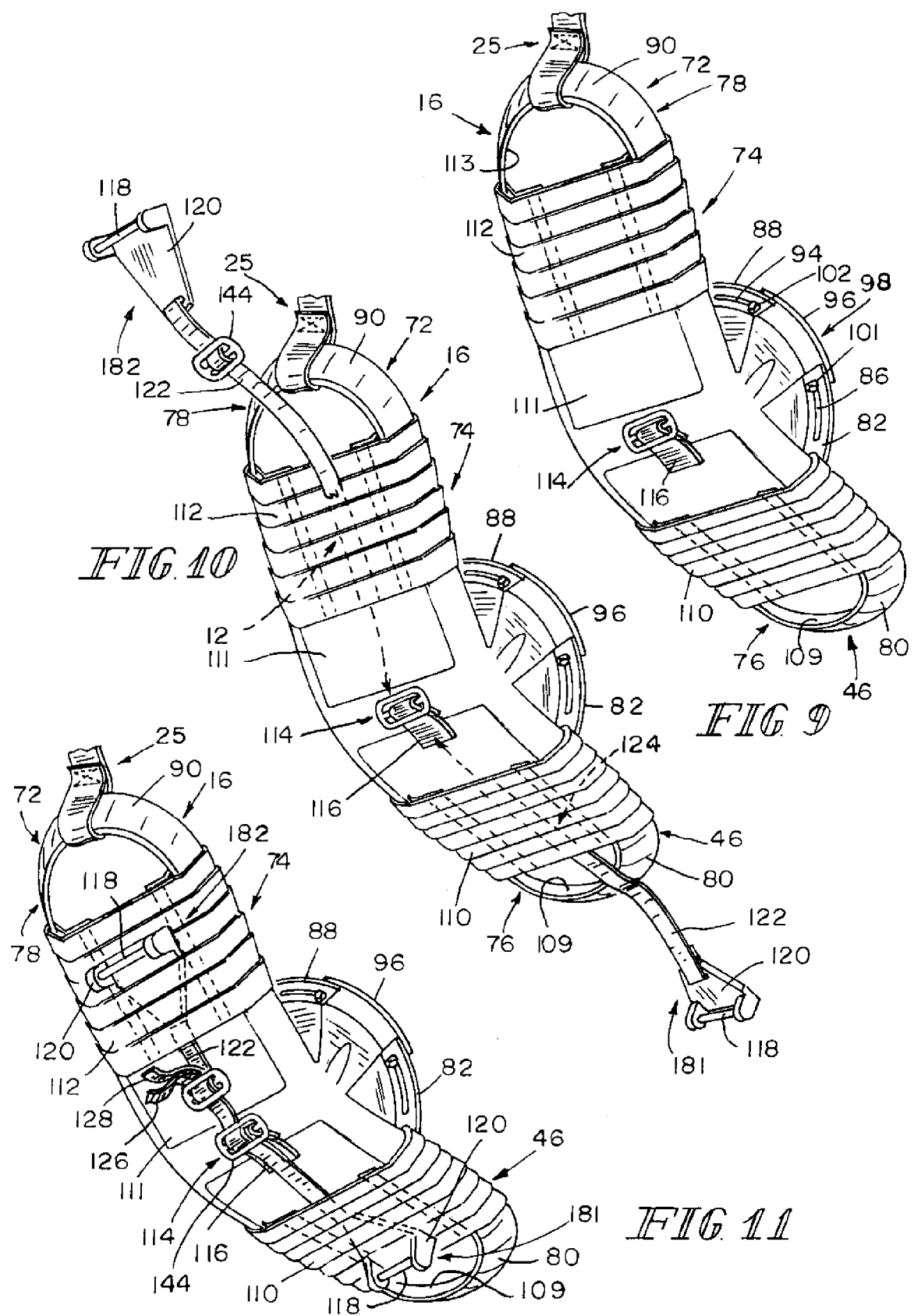

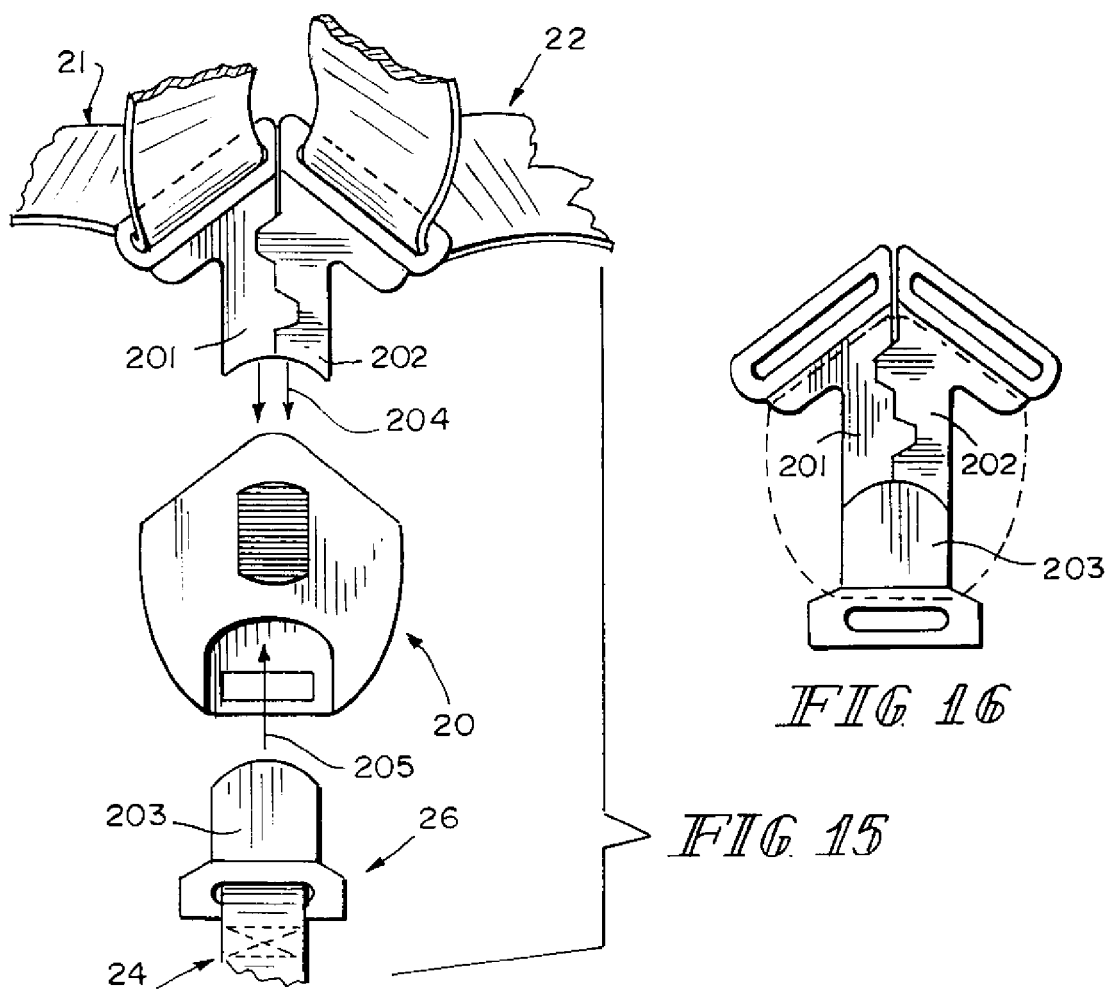
FIG. 15
FIG. 16
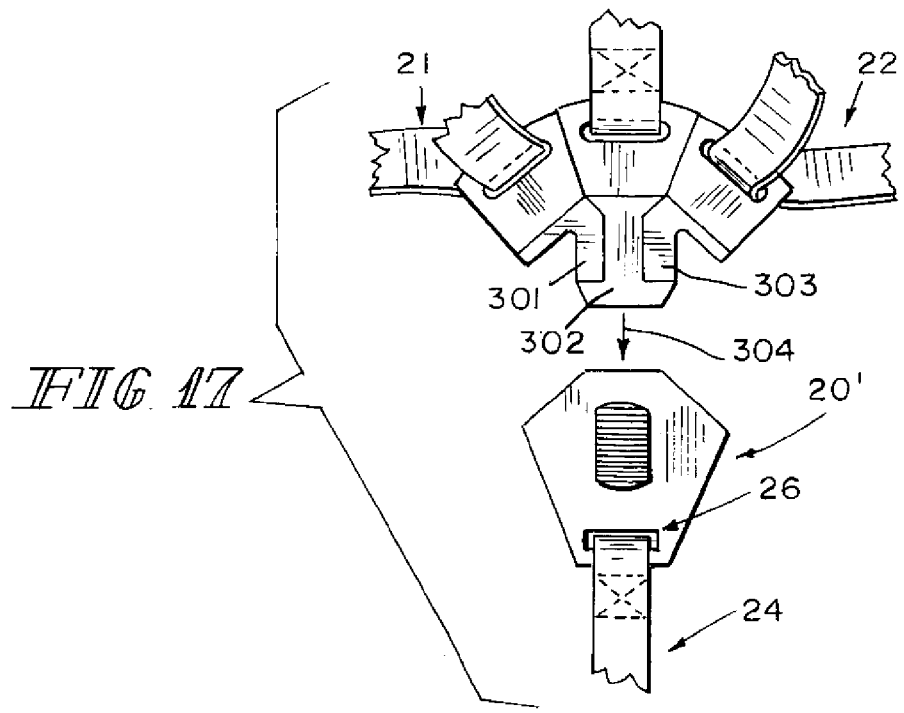
FIG. 17

JUVENILE SEAT WITH REMOVABLE, WEARABLE INFANT CARRIER SLING

This application claims priority under 35 U.S.C. §119(e) to U.S. Provisional Application Ser. No. 60/664,770, filed Mar. 24, 2005, which is expressly incorporated by reference herein.

BACKGROUND

The present disclosure relates to a juvenile seat, and particularly to an infant carrier. More particularly, the present disclosure relates to an infant seat sling apparatus.

SUMMARY

According to the present disclosure, an infant carrier sling is adapted to be worn by a caregiver or mounted in a seat shell included in a juvenile vehicle seat. In illustrative embodiments, the infant carrier sling includes an infant basin, a child-restraint harness, and a shoulder strap having one end passed through a slot formed in the infant basin and coupled to the child-resistant harness and another end coupled to the infant basin.

Additional features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the following figures in which:

FIG. 1 is a perspective view of a juvenile seat in accordance with the present disclosure showing an infant carrier sling mounted in a seat shell and arranged to underlie a carrier handle coupled to the seat shell and showing a shoulder strap included in the infant carrier sling;

FIG. 2 is a perspective view of the Juvenile seat of FIG. 1 showing the seat shell mounted on a base anchored in place in a rearward-facing position on a vehicle seat and showing the infant carrier sling and its shoulder strap in a position to receive an infant while the juvenile seat is anchored by a vehicle seat belt in a secured position on a vehicle seat;

FIG. 3 is a perspective view of the infant carrier sling of FIGS. 1 and 2 after the sling has been separated from the seat shell showing a caregiver using the shoulder to wear the sling and carry an infant without using the seat shell or base;

FIG. 4 is an enlarged perspective view of the infant carrier sling of FIGS. 1-3 showing an infant received in the sling;

FIG. 5 is an exploded perspective view of the infant carrier sling of FIG. 4 showing a foundation adapted to be coupled to the shoulder strap, a trim pad adapted to be coupled to the foundation and configured to define an infant receiver, and the shoulder strap;

FIGS. 9-11 are perspective views of the infant carrier sling of FIG. 4 showing staged installation of a carrier mount on a positioner sleeve made of a fabric material and coupled to the foldable frame so that the carrier mount is arranged to underlie the foldable frame as suggested in FIG. 11;

FIG. 9 shows a positioner sleeve coupled to the foldable frame of FIGS. 6-8 and formed to include spaced-apart louvered sections and a center section located between the louvered sections and a two-slot belt retainer tethered by a strap to the center section;

FIG. 10 shows two separate mount units which cooperate to form the carrier mount, each mount unit comprising an anchor bar, a bar support, and an anchor strap, and shows that the anchor straps are being passed through slots formed in the louvered sections and routed toward the two-slot belt retainer tethered by a strap to the center section;

FIG. 11 shows that a wedge-shaped portion of each of the bar supports has been inserted into a pocket formed in one of the louvered sections to orient the anchor bars in predetermined positions on undersides of the louvered sections and that a first of the anchor straps has been coupled to the tethered two-slot belt retainer and also to a second of the anchor straps (using another two-slot belt retainer coupled to the second of the anchor straps) to fix the two mount units in place in positions to provide a carrier mount that is ready to mate with mount retainers provided in the seat shell as shown, for example, in FIGS. 12 and 13;

FIG. 15 is a top plan view of components included in a buckle assembly in the harness assembly of FIG. 14;

FIG. 16 is another view of the buckle assembly of FIG. 15;

FIG. 17 is a top plan view of components included in another buckle assembly.

DETAILED DESCRIPTION

Figures 12, 13:
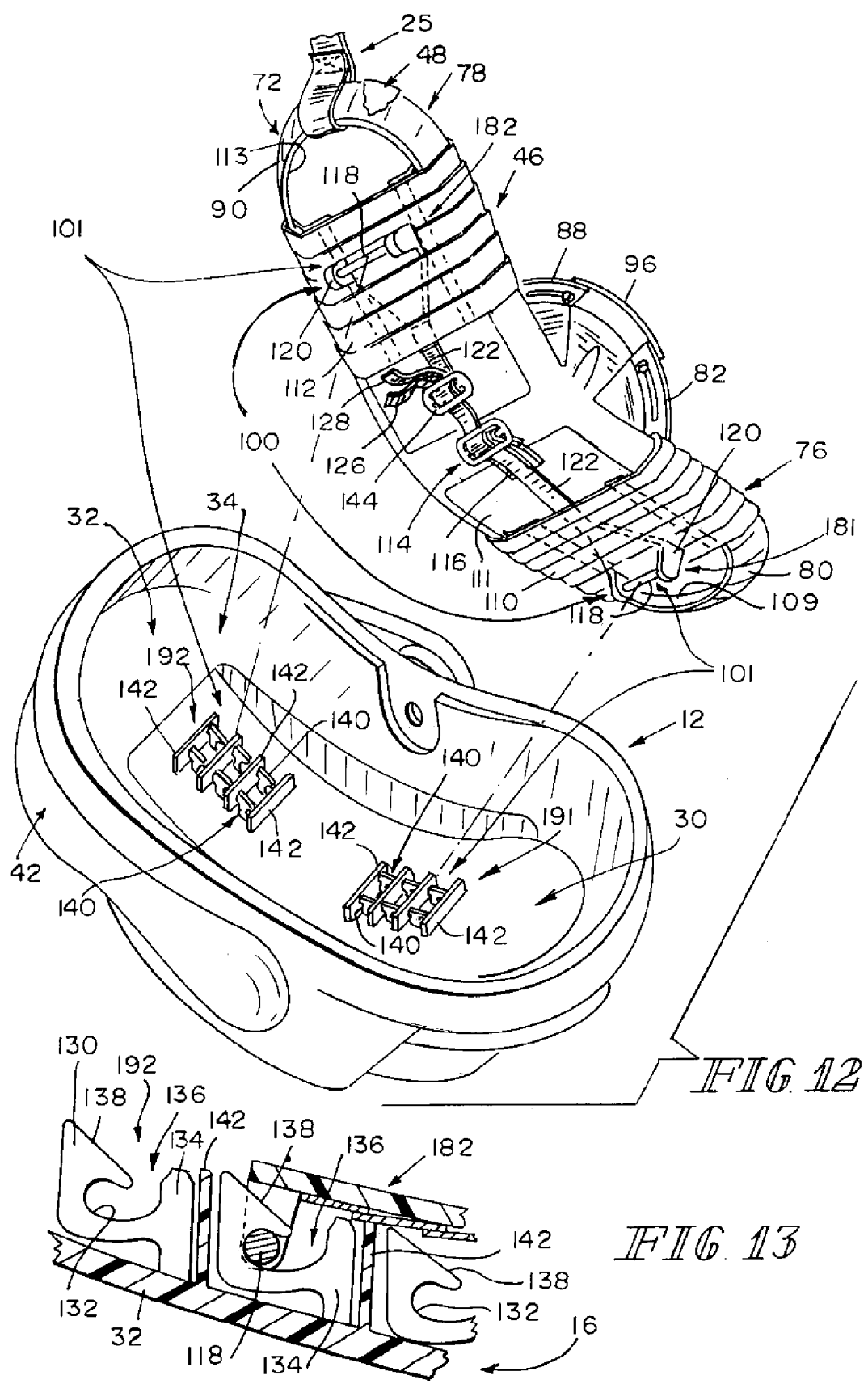
FIG. 12 is an exploded perspective assembly view showing movement of the infant carrier sling of FIG. 11 toward an underlying seat shell so that one of the anchor bars included in the carrier mount provided in the infant carrier sling will mate with one of the mount retainers included in the seat shell and another of the "carrier mount" anchor bars included in the sling will mate with another of the mount retainers included in the seat shell.
FIG. 13 is an enlarged sectional view showing mating engagement of one of the anchor bars included in a mount unit of the carrier mount provided in the infant carrier sling with a companion mount retainer included in the seat shell.

An infant carrier sling 10 is adapted to be mounted in a seat shell 12 as suggested in FIGS. 1, 2, and 12 or worn by a caregiver 14 using a shoulder strap 24 as suggested in FIG. 3. As shown, for example, in FIG. 14, infant carrier sling 10 includes an infant basin 16 and a harness assembly 18 comprising a buckle 20, infant retainer straps 21, 22 coupled to infant basin 16 and to buckle 20, and shoulder strap 24. Shoulder strap 24 has a first end 25 coupled to infant basin 16 and a second end 26 arranged to pass through a strap receiver slot 28 formed in infant basin 16 and to be coupled to buckle 20.

As suggested in FIGS. 1 and 12, seat shell 12 is formed to include a seat bottom 30 and seat back 32 that cooperate to form a basin-receiving cavity 34 sized and shaped to receive infant basin 16 therein. Once infant basin 16 is mounted in a fixed position in basin-receiving cavity 34 of seat shell 12, an infant 15 (see FIGS. 3 and 4) may be placed in infant basin 16 and restrained therein using harness assembly 18. In one mode, as shown in FIG. 2, seat shell 12 can be retained on a shell base 36 at rest on a vehicle seat 37 by, for example, a vehicle seat belt 38 to define a juvenile vehicle seat 40. In another mode, as shown in FIG. 1, a pivotable carrier handle 42 is coupled to seat shell 12 and arranged to overlie infant basin 16 when infant basin 16 is anchored in a fixed position in seat shell 12 to define a mobile infant carrier 44.

As suggested in FIGS. 3 and 4, infant carrier sling 10 can be removed from base-receiving cavity 34 formed in seat shell 12 and worn by caregiver 14 using shoulder strap 24 to provide wearable over-the-shoulder means for carrying infant 15 in an easy and nurturing manner while leaving the "weighty" seat shell 12 and carrier handle 42 behind in this "light-travel" mode, a caregiver can transport infant 15 easily using only infant basin 16 and shoulder strap 24.

In an illustrative embodiment shown in FIG. 5, infant basin 16 comprises a foundation 46 and a trim pad 48. Trim pad 48 is sized and shaped to be mounted on foundation 46 as suggested in FIG. 4 to provide a soft and supportive receptacle in infant basin 16 for infant 15. Foundation 46 provides a sturdy frame on which trim pad 48 is mounted and to which first end 25 of shoulder strap 24 is attached. Foundation 46 includes a foundation bottom 51, a foundation back 53 coupled to first end 25 of shoulder strap 24, and a middle portion 52 interconnecting foundation bottom 51 and back 53. In an illustrative embodiment, foundation 46 is foldable as suggested in FIGS. 6-8. It is within the scope of this disclosure to couple first end 25 of shoulder strap 24 to a mount ring 23 included in foundation 46 and coupled to a portion of frame 72 also included in foundation 46 as suggested in FIG. 5.

Trim pad 48 includes a bottom pad 54 adapted to rest on foundation bottom 51 and bottom side walls 56, 58 coupled to bottom pad 54 as suggested in FIG. 5. Bottom side walls 56, 58 are configured to be coupled to one another using a zipper 60 (or other suitable connector) to form an open-ended bottom pocket 61 located under bottom pad 54 and sized to receive a free end of foundation bottom 51 therein. Bottom pad 54 is also formed to include a first pad slot 55 that is sized to receive shoulder strap 24 therethrough and thus cooperates to form strap receiver slot 28 formed in infant basin 16.

Trim pad 48 also includes a top pad 62 adapted to rest on foundation back 53 and top side walls 64, 66 coupled to top pad 62. Top side walls 64, 66 are configured to be coupled to one another using a zipper 68 (or other suitable connector) to form an open-ended top pocket 70 located under top pad 62 and sized to receive a free end of foundation back 53 therein as suggested in FIGS. 3 and 5. Top pad 62 is also formed to include a second pad slot 63 that is sized to receive a portion of first end 25 of shoulder strap 24 therein to facilitate attachment of first end 25 to infant basin 16.

Trim pad 48 may be removed easily from foundation 46 so that it can be cleaned or replaced. Moreover, a variety of trim pads 48 an be made using a variety of patterns and materials to enable a manufacturer or caregiver to customize infant carrier sling 10 using a selected trim pad 48 to produce a certain "look" or "feel" associated with the infant carrier sling.

An infant basin anchor system 101 is disclosed herein for anchoring infant basin 16 in a fixed position in a basin-receiving cavity 34 formed in seat shell 12 as suggested, for example, in FIGS. 1, 2, and 12. In such embodiments, infant basin 16 is coupled to seat shell 12 when infant carrier sling 10 is not being worn by a caregiver in the manner suggested in FIG. 3. Harness assembly 18 is used to restrain an infant lying in infant basin 16 whether infant basin 16 is anchored to seat shell 12 as shown in FIGS. 1 and 2 or worn by a caregiver as shown in FIG. 3. Infant basin anchor system 101 includes first and second mount retainers 191, 192 coupled to seat shell 12 and companion first and second mount units 181, 182 coupled to infant basin 16 as shown, for example, in FIG. 12. First mount unit 181 is configured to mate with first mount retainer 191 and second mount unit 182 is configured to mate with second mount retainer 192 as suggested, for example, in FIG. 12. These mating engagements can be "released" or "undone" as disclosed herein whenever a caregiver affirmatively desires to separate infant basin 16 from seat shell 12 so that it can be worn by the caregiver.

In an illustrative embodiment shown in FIGS. 6-11, foundation 46 comprises a foldable frame 72 and a positioner sleeve 74. First and second mount units 181, 182 are coupled to positioner sleeve 74 in an illustrative embodiment. Positioner sleeve 74 is configured to be coupled to foldable frame 72 as suggested, for example, in FIG. 9 to provide means for retaining first and second mount units 181, 182 in fixed positions relative to foldable frame 72. As suggested in FIG. 12, first and second mount units 181, 182 cooperate with first and second mount retainers 191, 192 included in infant basin 16 to retain infant carrier sling 10 in a fixed position in basin-receiving cavity 34 formed in infant basin 16.

Figure 6:
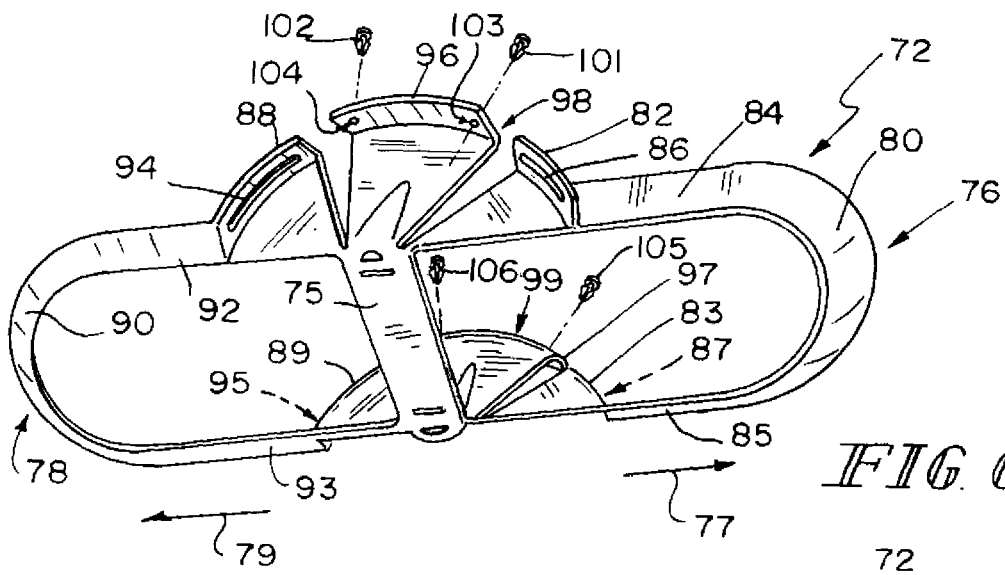
FIGS. 6-8 show a foldable frame included in the foundation of the infant carrier sling as the foldable frame is moved from an expanded position shown in FIG. 6, to a partly folded position shown in FIG. 7, and then to a folded position shown in FIG. 8.

In an illustrative embodiment, foldable frame 72 is a flexible, monolithic element made of plastics material and is molded in an "open" position of a bit more than a 180° position shown in FIG. 6. Foldable frame 72 is included in foundation 46 of infant carrier sling 10 and can be moved by caregiver 14 to an expanded position shown in FIG. 6, a partly folded position shown in FIG. 7, and a folded position shown in FIG. 8.

Foldable frame 72 includes a laterally extending center rail 75, a U-shaped bottom wicket 76 extending from center rail 75 in a first direction 77, and a U-shaped top wicket 78 extending from center rail 75 in an opposite second direction 79 as shown in FIG. 6. Center rail 75 is thus interposed between bottom and top wickets 76, 78.

First and second curved outboard flanges 82, 83 are appended to first and second legs 84, 85 of U-shaped bottom wicket 76 as suggested in FIG. 6, and each flange 82, 83 is formed to include a pin-receiving slot 86, 87. Outboard flanges 82, 83 are arranged to extend in opposite directions away from one another to cause portions of first and second legs 84, 85 to lie between outboard flanges 82, 83. U-shaped bottom wicket 76 includes a curved bight section 80 interconnecting first and second legs 84, 85. Similarly, first and second curved outboard flanges 88, 89 are appended to first and second legs 92, 93 of U-shaped top wicket 78 as suggested in FIG. 6, and each flange 88, 89 is formed to include a pin-receiving slot 94, 95. Outboard flanges 88, 89 are arranged to extend in opposite directions away from one another to cause portions of first and second legs 92, 93 to lie between outboard flanges 92, 93. U-shaped top wicket 78 includes a curved bight section 90 interconnecting first and second legs 92, 93.

Further, first and second curved outboard flanges 96, 97 are included in upright pie-shaped members 98, 99 cantilevered to opposite ends of laterally extending center rail 75 as suggested in FIG. 6. Two guide pins 101, 102 (provided with suitable fasteners) are provided for outboard flange 96 as shown in FIG. 6 and sized to pass through apertures 103, 104 formed in outboard flange 96. Likewise, two guide pins 105, 106 (provided with suitable fasteners) are provided for outboard flange 97 as shown in FIG. 6 and sized to pass through apertures (not shown) formed in outboard flange 97.

Figure 7:
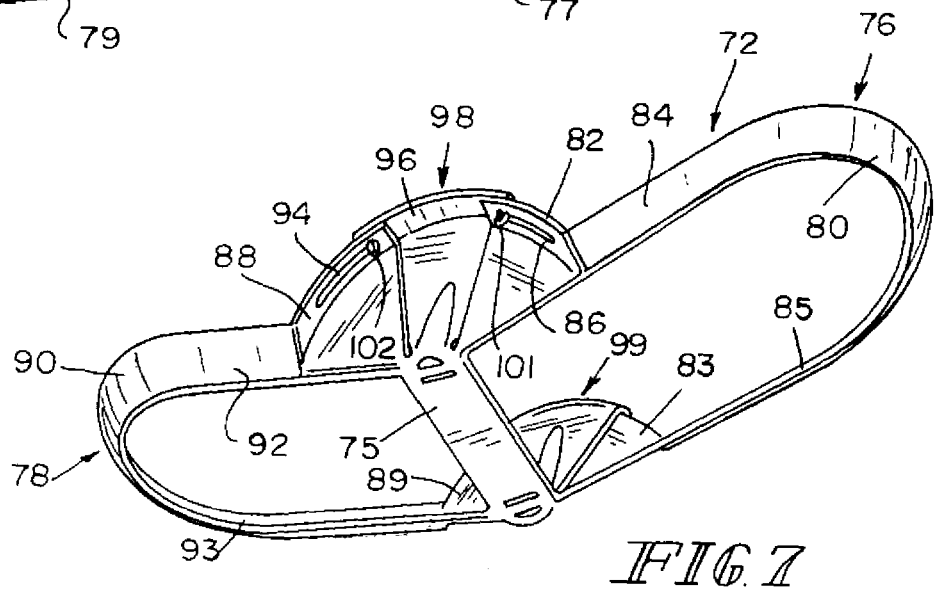
Figure 8:
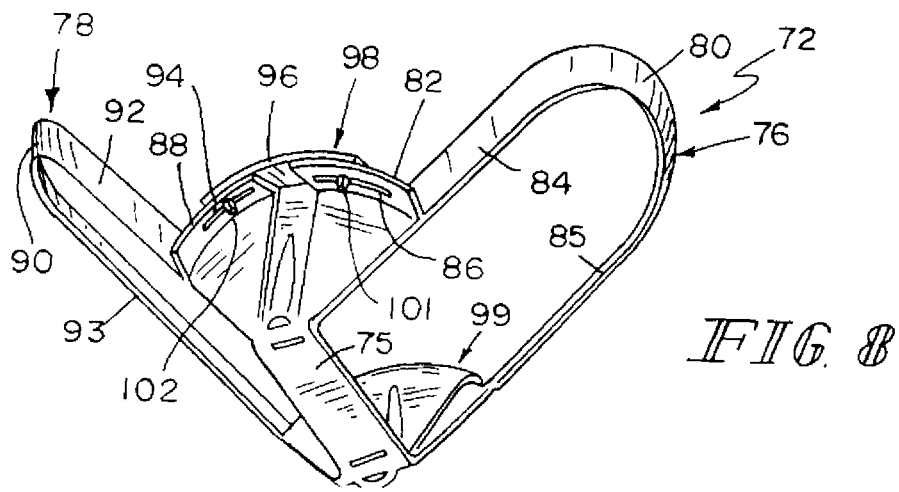

As suggested, for example, in FIGS. 7 and 8, outboard flange 96 on upright pie-shaped member 98 is arranged to lie between and mate in side-by-side reciprocating and sliding relation with each of companion outboard flanges 82, 88.

Guide pin 101 on outboard flange 96 extends into pin-receiving channel 86 formed in outboard flange 82 while guide pin 102 on outboard flange 96 extends into pin-receiving channel 94 formed in outboard flange 88. These guide pins 101, 102 move back and forth in curved pin-receiving channels 86, 94 to control relative movement of bottom and top wickets 76, 78 toward and away from one another as frame 72 is folded as suggested in FIGS. 6-8.

Similarly, outboard flange 97 on upright pie-shaped member 98 is arranged to lie between and mate in side-by-side reciprocating and sliding relation with each of companion outboard flanges 83, 89. Guide pin 103 on outboard flange 97 extends into pin-receiving channel 87 formed in outboard flange 83 while guide pin 104 on outboard flange 97 extends into pin-receiving channel 95 formed in outboard flange 89. These guide pins 103, 104 move back and forth in curved pin-receiving channels 87, 95 to assist in controlling relative movement of bottom and top wickets 76, 78 toward and away from one another as frame 72 is folded as suggested in FIGS. 6-8. In the illustrated embodiment, channels 86, 94, 87, 95 are "pinned" using guide pins 101-104 to limit the range of motion of top wicket 78 relative to bottom wicket 76 in frame 72 foundation 46 to about 90° from flat (i.e., about 180°).

Staged installation of a carrier mount 100 comprising first and second mount units 181, 182 on positioner sleeve 74 in accordance with an illustrative embodiment of the present disclosure is shown, for example, in FIGS. 9-11. Once carrier mount 100 is coupled to positioner sleeve 74, then first and second mount units 181, 182 are mated with first and second mount retainers 191, 192 in seat shell 12 as suggested, for example, in FIGS. 12 and 13.

A positioner sleeve 74 configured to be coupled to frame 72 of foundation 46 and formed to include spaced-apart bottom and top "louvered" sections 110, 112 and a center section 111 located between bottom and top louvered sections 110, 112 is shown, for example, in FIGS. 9-11. In the illustrated embodiment, sections 110, 111, and 112 are made of a fabric material, which material is pleated to form louvered sections 110, 112. This fabric material is sewn to produce positioner sleeve 74. In an illustrative embodiment, positioner sleeve 74 is sewn up flat, then sewn directly onto frame 72 of foundation 46. As shown in FIG. 9, bottom section 110 is coupled to bottom wicket 76 of frame 72 to produce a semicircular opening 109 near curved bight section 80 while top section 112 is coupled to top wicket 78 of frame 72 to produce a semicircular opening 113 near curved bight section 90. Semicircular opening 109 is configured to receive a middle portion 27 of shoulder strap 24 therein to help form strap receiver slot 28.

Positioner sleeve 74 also includes a two-slot belt retainer 114 tethered by a strap 116 to center section 111 as shown in FIG. 9. Two separate mount units 181, 182 cooperate to form portions of carrier mount 100 as suggested in FIGS. 3 and 12. Each of mount units 181, 182 comprises an anchor bar 118, a bar support 120 coupled to anchor bar 118, and an anchor strap 122 coupled to bar support 120.

Anchor strap 122 of first mount unit 181 passes through a slot 124 formed in bottom louvered section 110 and is routed to mate with and pass through two-slot belt retainer 114 as suggested in FIG. 10. As suggested in FIG. 11, a wedge-shaped portion of bar support 120 of mount unit 181 is inserted into a first pocket formed in bottom louvered section 110 to orient the companion anchor bar 118 in a predetermined position on the underside of bottom louvered section 110 so that such anchor bar 118 is ready to mate with a companion retainer mount 191 included in seat shell 12 as suggested in FIG. 12.

Anchor strap 122 of second mount unit 182 passes through a slot 125 formed in top louvered section 112 as suggested in FIG. 10. As suggested in FIG. 11, a wedge-shaped portion of bar support 120 of mount unit 182 is inserted into a second pocket formed in top louvered section 112 to orient the companion anchor bar 118 in a predetermined position on the underside of top louvered section 112 so that such anchor bar 118 is ready to mate with a companion retainer mount 192 included in seat shell 12 as suggested in FIG. 12.

A strap connector provided, for example, by a two-slot buckle 144 is coupled to strap 122 of second mount unit 182 as suggested, for example, in FIG. 10. A free end 126 of first mount unit strap 122 is passed through first and second slots formed in two-slot belt retainer 114 and through first and second slots formed in two-slot buckle 144 and a free end 128 of second mount unit strap 122 is "doubled back" through the first and second slots formed in two-slot buckle 144 as suggested in FIGS. 10-12 to fix the two mount units 181, 182 in place in fixed positions relative to positioner sleeve 74 to provide a carrier mount 100 that is ready to mate with mount retainers 191, 192 provided in seat shell 12 as suggested in FIG. 12. The "strapping" used to create the mount unit 181, 182 positioning system is overlapped in such a way that when the two ends 126, 128 are drawn together, each of the wedge-shaped portions of the two bar supports 120 are captured within a companion louvered pocket formed in either bottom or top louvered section 110, 112.

As suggested in FIG. 12, infant carrier sling 10 can be installed in an underlying seat shell 12 by a caregiver first by moving sling 10 so that one of the carrier mount anchor bars 118 included in carrier mount 100 provided in sling 10 mates with first mount retainer 191 included in seat shell 12. Next, another of the carrier mount anchor bars 118 included in carrier mount 100 provided in sling 10 is mated with second mount retainer 192 also included in seat shell 12.

Mating engagement of anchor bar 118 included in second mount unit 182 of carrier mount 100 coupled to infant carrier sling 10 with a companion mount retainer 192 coupled to seat shell 12 is shown, for example, in FIG. 13. Mount retainer 192 includes an upright hook-shaped bar retainer 130 formed to include a bar retention slot 132 and an upright post 134 located in spaced-apart relation from bar retainer 130 to define a bar entry slot 136 communicating with bar retention slot 132. Bar retainer 130 includes an inclined ramp 138 for contacting an approaching anchor bar 118 and guiding it toward and into an inlet opening into bar entry slot 136 to facilitate insertion of the anchor bar 118 into an associated bar retention slot 132. In the embodiment illustrated in FIG. 12, each of mount retainers 191, 192 comprises three sets of two retainer members 140 arranged to lie in side-by-side spaced-apart relation to one another, and each retainer member 140 includes a bar retainer 130 and a post 134. Each matched pair of retainer members 140 is separated by an upright partition wall 142. Multiple sets of retainers 140 are provided for each mount retainer 191, 192 in seat shell 12 to accommodate a range of harness adjustment built into infant carrier sling 10.

By mating anchor bars 118 of carrier mount 100 to mount retainers 191, 192 in seat shell 12, a secure interface tying infant carrier sling 10 to seat shell 12 is provided. Thus, sling 10 can be removed from seat shell 12 at the option of a caregiver by unmating anchor bars 118 from mount retainers 191, 192 for more convenient carrying as suggested in FIG. 3, yet can also be used to mount infant carrier sling 10 securely in seat shell 12 as suggested in FIGS. 1 and 2.

Figure 14:
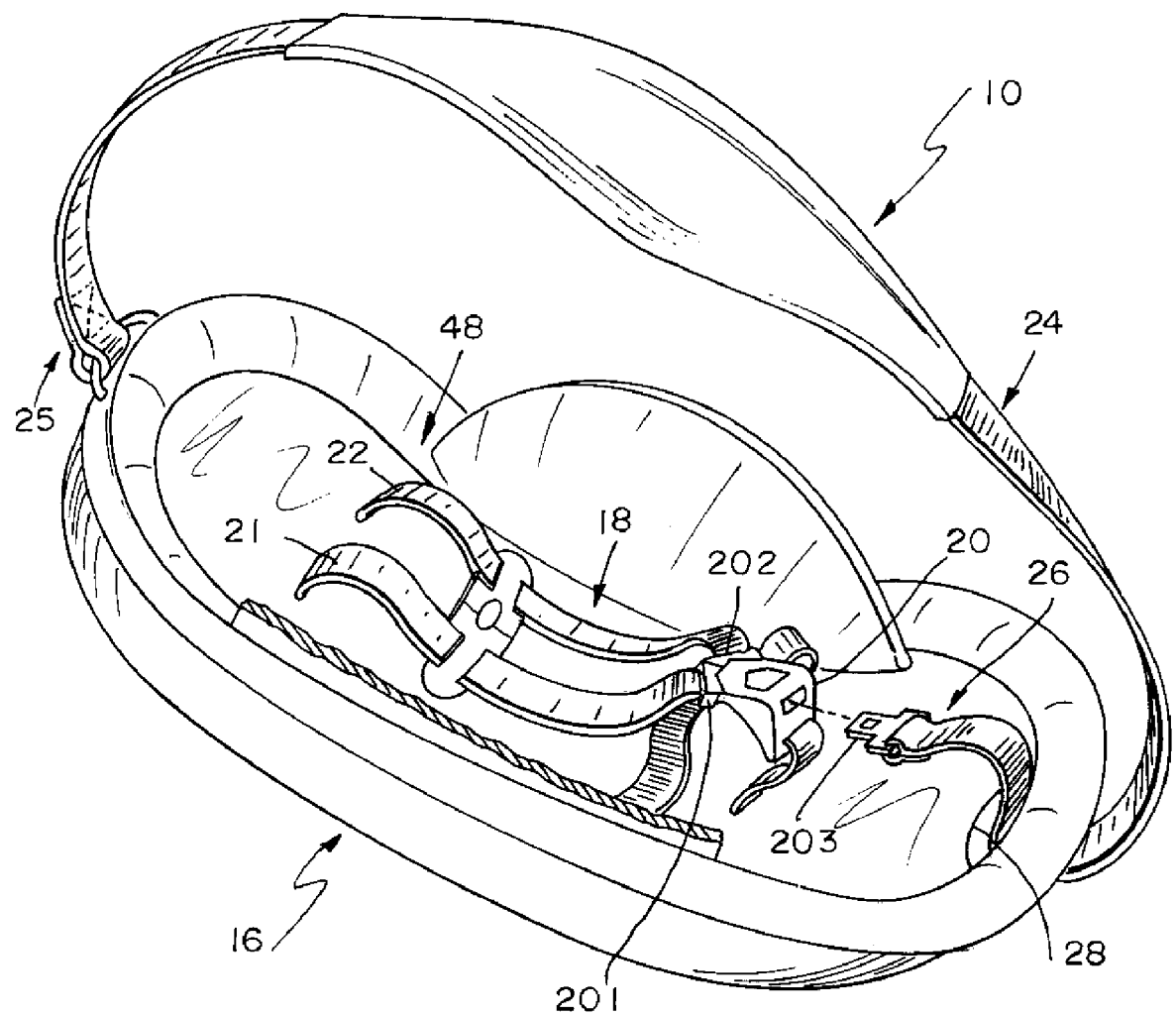
FIG. 14 is an enlarged perspective view of the infant carrier sling of FIG. 4 with a portion of the trim pad removed to reveal a five-point harness assembly included in the sling.

To ensure that child 15 is confined properly within infant carrier sling 10, shoulder strap 24 is "disabled" unless child 15 is buckled into harness assembly 18 in a manner suggested, for example, in FIGS. 14-17. One embodiment of a three-way puzzle buckle 20 is illustrated in FIGS. 14-16 and another embodiment of such a buckle 20' is illustrated in FIG. 17. In the embodiment of FIGS. 14-16, final intersection of the three pieces 201, 202, 203 occurs within buckle 20. In the embodiment of FIG. 17, all three pieces 301, 302, 303 are assembled prior to insertion into buckle 20' by means of bi-directional (e.g., 204, 205) insertion. In both embodiments, buckle 20 (20') does not latch unless all three pieces 201, 202, 203 (301, 302, 302) are in place in buckle 20 (20') by means of a single direction of insertion 304. This way, the child must be buckled into and restrained by harness assembly 18 at all times before a caregiver can pick up infant carrier sling 10 using shoulder strap 24. In the embodiment of FIGS. 14-16, free end 26 of shoulder strap 24 provides piece 203. In the embodiment of FIG. 17, free end 26 of shoulder strap 24 is coupled to buckle 20'.

Figure 18:
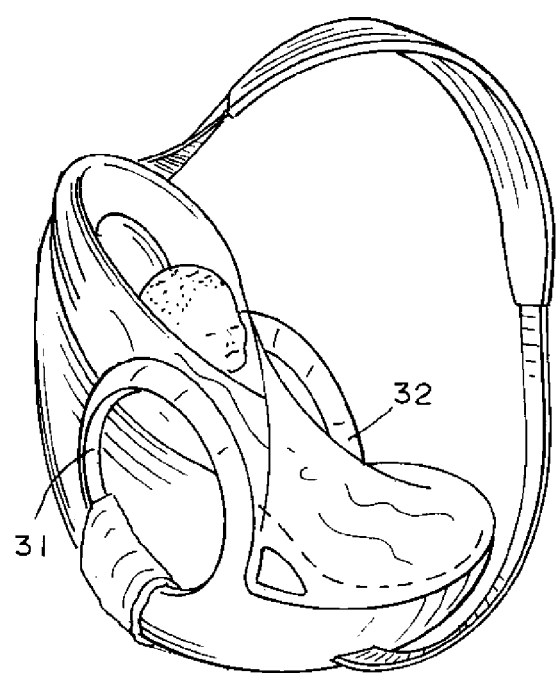
FIGS. 18-21 are perspective views illustrating other embodiments of an infant carrier sling in accordance with the present disclosure.

In another embodiment shown in FIG. 18, side handles 311, 312 provide more grip options for the caregiver. Wrap-over swaddling 313 with hook-and-loop or magnetic closure means is provided.

Figure 19:
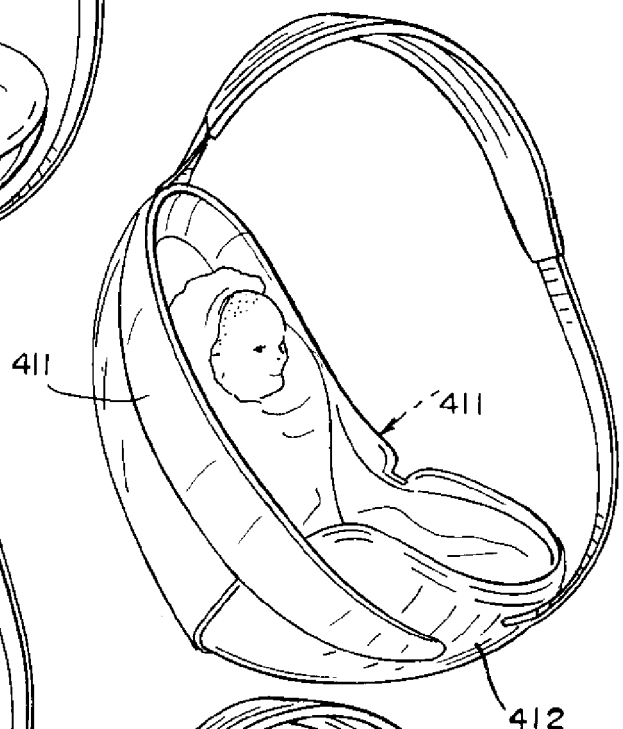

In yet another embodiment shown in FIG. 19, side flaps 411 are fixed to the upper and rear portion of the sling while being free at the other end. This, in conjunction with an elastic portion 412 coupled to the free end, allows the free end to hold the sling at either 90° or to allow it to lay out flat. The swaddling is zippered around the foot area and is loose around the rest of the infant.

Figure 20:
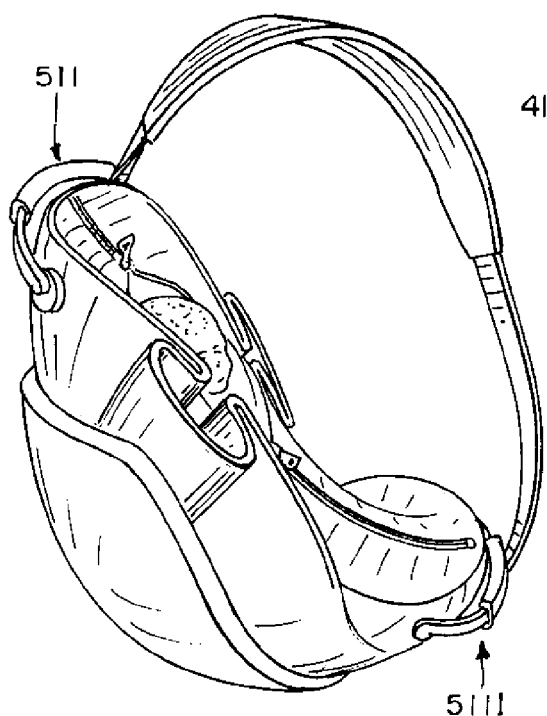

In still another embodiment shown in FIG. 20, a pleated wing is provided. A padded outer section lays comfortably against the caregiver. Integrated carry handles 511 with molded rubber grips are provided.

Figure 21:
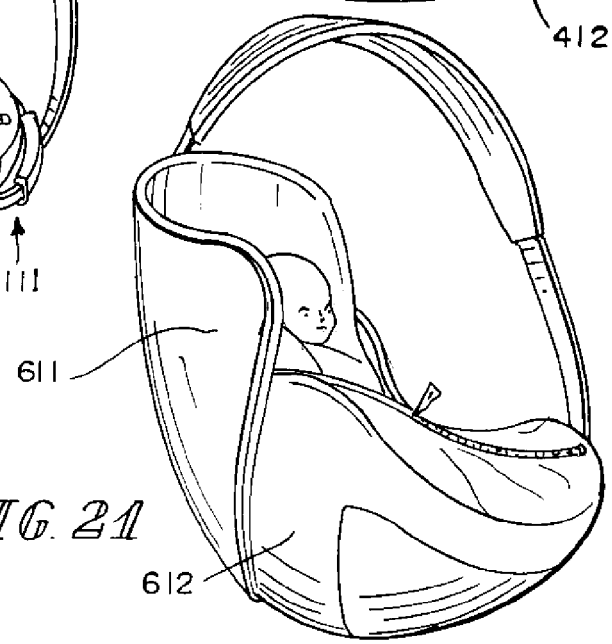

In yet another embodiment shown in FIG. 21, padded side wings 611 and 612 overlap one another in "ski-boot" style to accommodate flexing motion of bottom and top portions of the infant basin. A zippered and removable outer closure covers the child from the neck down.

The invention claimed is:

1. An infant seat comprising
a seat shell including a seat bottom and a seat back cooperating with the seat bottom to form a basin-receiving cavity,
an infant carrier sling adapted to be worn by a caregiver in one mode and mounted in the basin-receiving cavity of the seat shell in another mode, the infant carrier sling including an infant basin sized and shaped to fit in the basin-receiving cavity and a harness assembly coupled to the infant basin and configured to restrain an infant lying in the infant basin, the harness assembly comprising a child-restraint harness coupled to the infant basin and a shoulder strap having a first end coupled to one end of the infant basin, a second end releasably coupled to the child-restraint harness, and a middle portion located between the first and second ends and arranged to pass through a receiver slot formed in another end of the infant basin to provide wearable over-the-shoulder means for carrying the infant basin upon separation of the infant basin from the seat shell so that a caregiver can wear the shoulder strap over one shoulder to suspend the infant basin in close proximity to a torso portion of the caregiver only when the second end of the shoulder strap is coupled to the child-restraint harness,
anchor means for anchoring the infant basin in a fixed position in the basin-receiving cavity of the seat shell when the infant carrier sling is not being worn by a caregiver so that an infant can be restrained in the infant basin when the infant basin is anchored to the seat shell or separated from the seat shell and carried by a caregiver using the wearable over-the-shoulder means, the anchor means including a frrst mount retainer coupled to the seat shell and a carrier mount coupled to the infant basin and configured to mate with the first mount retainer to anchor the infant basin in the fixed position in the basin-receiving cavity,
wherein the first mount retainer is coupled to the seat bottom of the seat shell, the anchor means further includes a second mount retainer coupled to the seat back of the seat shell, and the carrier mount includes a first mount unit located on an underside of the infant basin and configured to mate with the first mount retainer and a second mount unit located on the underside of the infant basin and configured to mate with the second mount retainer, and
wherein the first mount unit includes a first anchor bar, a first bar support coupled to the anchor bar, and a first anchor strap coupled to the first bar support, the second mount unit includes a second anchor bar, a second bar support, and a second anchor strap coupled to the second bar support, the carrier mount further includes a strap connector coupled to the first and second anchor straps, the first mount retainer includes first mating means for mating with the first anchor bar to anchor a bottom portion of the infant basin to the seat bottom of the seat shell, and the second mount retainer includes second mating means for mating with the second anchor bar to anchor a back portion of the infant basin to the seat back of the seat shell.

2. The infant seat of claim 1, wherein the child-restraint harness includes a buckle, a first retainer strap coupled to the infant basin and to the buckle, a second retainer strap coupled to the infant basin and to the buckle, and the second end of the shoulder strap is releasably coupled to the buckle.

3. The infant seat of claim 1, further comprising a carrier handle coupled to the seat shell and arranged to overlie the infant basin to provide means for allowing a caregiver to carry the infant basin in the seat shell without using the shoulder strap when the infant basin is anchored in the fixed position to define a mobile infant carrier and wherein the middle portion of the shoulder strap is movable to assume an unused position alongside the seat shell to enable a caregiver to use the carrier handle to carry the infant basin in the seat shell.

4. The infant seat of claim 1, wherein the first mating means includes an upright hook-shaped bar retainer formed to include a bar retention slot and an upright post located in spaced-apart relation to the upright hook-shaped bar retainer to define a bar entry slot communicating with the bar retention slot, and the first anchor bar is located in the bar retention slot to anchor the bottom portion of the infant basin to the seat bottom of the seat shell.

5. The infant seat of claim 1, wherein the strap connector includes a two-slot belt retainer, a tether strap coupled to the two-slot belt retainer and to the infant basin, and a two-slot buckle coupled to the second anchor strap, the first anchor strap extends through first and second slots formed in the two-slot belt retainer and first and second slots formed in the two-slot buckle, and the second anchor strap extends through the first and second slots formed in the two-slot buckle.

6. The infant seat of claim 1, wherein the first mount retainer includes an upright hook-shaped bar retainer formed to include a bar retention slot and an upright post located in spaced-apart relation to the upright hook-shaped bar retainer to define a bar entry slot communicating with the bar retention slot and the carrier mount includes a first anchor bar located in the bar retention slot to anchor the infant basin in the fixed position in the basin-receiving cavity.

7. The infant seat of claim 6, wherein the upright hook-shaped bar retainer includes an inclined ramp configured to provide means for contacting an approaching anchor bar included in the carrier mount and guiding the approaching anchor bar toward and into an inlet opening into the bar entry slot to facilitate insertion of the approaching anchor bar into the bar retention slot communicating with the bar entry slot.

8. The infant seat of claim 6, wherein the carrier mount includes a first mount unit configured to include the first anchor bar and the infant basin includes a foundation comprising a frame and a positioner sleeve coupled to the frame and configured to retain the first mount unit in a fixed position relative to the frame to orient the first anchor bar to pass into the bar entry slot during movement of the infant basin to assume the fixed position in the basin-receiving cavity formed in the seat shell.

9. The infant seat of claim 1, wherein the infant basin includes a foundation and a trim pad mounted on the foundation to provide a soft and supportive receptacle in the infant basin for an infant and the foundation is formed to include a first foundation slot aligned with a first pad slot formed in the trim pad to form the strap receiver slot receiving the middle portion of the shoulder strap therein.

10. The infant seat of claim 9, wherein the foundation includes a foundation bottom formed to include the first foundation slot and a foundation back coupled to the first end of the shoulder strap, the trim pad includes a bottom pad arranged to rest on the foundation bottom and formed to include the first pad slot, a first bottom side wall coupled to one side edge of the bottom pad, a second bottom side wall coupled to another side edge of the bottom pad, and a connector configured to connect first and second bottom side walls to one another to form an open-ended pocket located under the bottom pad to receive a free end of the foundation bottom therein.

11. The infant seat of claim 1, wherein the infant basin includes a frame and a positioner sleeve coupled to the frame and configured to retain the carrier mount in a fixed position on the frame.

12. The infant seat of claim 11, wherein the frame and positioner sleeve cooperate to define the strap receiver slot therebetween.

13. An infant seat comprising
a seat shell including a seat bottom and a seat back cooperating with the seat bottom to form a basin-receiving cavity,
an infant carrier sling adapted to be worn by a caregiver in one mode and mounted in the basin-receiving cavity of the seat shell in another mode, the infant carrier sling including an infant basin sized and shaped to fit in the basin-receiving cavity and a harness assembly coupled to the infant basin and configured to restrain an infant lying in the infant basin, the harness assembly comprising a child-restraint harness coupled to the infant basin and a shoulder strap having a first end coupled to one end of the infant basin, a second end releasably coupled to the child-restraint harness, and a middle portion located between the first and second ends and arranged to pass through a strap receiver slot formed in another end of the infant basin to provide wearable over-the-shoulder means for carrying the infant basin upon separation of the infant basin from the seat shell so that a caregiver can wear the shoulder strap over one shoulder to suspend the infant basin in close proximity to a torso portion of the caregiver only when the second end of the shoulder strap is coupled to the child-restraint harness,
anchor means for anchoring the infant basin in a fixed position in the basin-receiving cavity of the seat shell when the infant carrier sling is not being worn by a caregiver so that an infant can be restrained in the infant basin when the infant basin is anchored to the seat shell or separated from the seat shell and carried by a caregiver using the wearable over-the-shoulder means, the anchor means including a first mount retainer coupled to the seat shell and a carrier mount coupled to the infant basin and configured to mate with the first mount retainer to anchor the infant basin in the fixed position in the basin-receiving cavity,
wherein the infant basin includes a frame and a positioner sleeve coupled to the frame and configured to retain the carrier mount in a fixed position on the frame, and
wherein the frame includes a laterally extending center rail, a U-shaped bottom wicket extending from the center rail in a first direction and a U-shaped top wicket extending from the center rail in an opposite second direction to interpose the center rail between the U-shaped top and bottom wickets, the positioner sleeve includes spaced-apart top and bottom sections and a center section located between the top and bottom sections, the bottom section of the positioner sleeve is coupled to the U-shaped bottom wicket of the frame to produce a semi-circular opening lying near a curved bight section included in the U-shaped bottom wicket and defining the strap receiver slot, and the top section of the positioner sleeve is coupled to the U-shaped top wicket of the frame.

14. The infant seat of claim 13, wherein the carrier mount includes first and second mount units, the first mount unit is inserted into a first pocket provided by the positioner sleeve and formed in the bottom section of the positioner sleeve, the second mount unit is inserted into a second pocket provided by the positioner sleeve and formed in the top section of the positioner sleeve, the first mount unit is configured to mate with the first mount retainer, and the second mount unit is configured to mate with the second mount retainer.

15. An infant seat comprising
a seat shell including a seat bottom and a seat back cooperating with the seat bottom to form a basin-receiving cavity,
an infant carrier sling adapted to be worn by a caregiver in one mode and mounted in the basin-receiving cavity of the seat shell in another mode, the infant carrier sling including an infant basin sized and shaped to fit in the basin-receiving cavity and a harness assembly coupled to the infant basin and configured to restrain an infant lying in the infant basin, the harness assembly comprising a child-restraint harness coupled to the infant basin and a shoulder strap having a first end coupled to one end of the infant basin, a second end releasably coupled to the child-restraint harness, and a middle portion located between the first and second ends and arranged to pass through a strap receiver slot formed in another end of the infant basin to provide wearable over-the-shoulder means for carrying the infant basin upon separation of the infant basin from the seat shell so that a caregiver can wear the shoulder strap over one shoulder to suspend the infant basin in close proximity to a torso portion of the caregiver only when the second end of the shoulder strap is coupled to the child-restraint harness,
anchor means for anchoring the infant basin in a fixed position in the basin-receiving cavity of the seat shell when the infant carrier sling is not being worn by a caregiver so that an infant can be restrained in the infant basin when the infant basin is anchored to the seat shell or separated from the seat shell and carried by a caregiver using the wearable over-the-shoulder means, the anchor means including a first mount retainer coupled to the seat shell and a carrier mount coupled to the infant basin and configured to mate with the first mount retainer to anchor the infant basin in the fixed position in the basin-receiving cavity, wherein the infant basin includes a frame and a positioner sleeve coupled to the frame and configured to retain the carrier mount in a fixed position on the frame, and wherein the carrier mount includes first and second mount units, each of the first and second mount units includes an anchor bar, a bar support coupled to the anchor bar, and an anchor strap coupled to the bar support, the anchor bar of the first mount unit mates with the first mount retainer to anchor one portion of the frame to the seat shell, the anchor bar of the second mount unit mates with the second mount retainer to anchor another portion of the frame to the seat shell, and the positioner sleeve is formed to include a first pocket receiving the bar support of the first mount unit and a second pocket receiving the bar support of the second mount unit.

16. The infant seat of claim 15, wherein the carrier mount further includes a strap connector coupled to the anchor straps included in the first and second mount units to retain the bar support of the first mount unit in the first pocket and the bar support of the second mount unit in the second pocket.

* * * * *